United States Patent Office

Re. 24,253
Reissued Dec. 11, 1956

24,253

METHOD OF PRODUCING A COMPOSITE LIQUID BITUMINOUS BINDER

John F. Beaver, Piqua, Ohio

No Drawing. Original No. 2,602,774, dated July 8, 1952, Serial No. 26,475, May 11, 1948. Application for reissue July 12, 1955, Serial No. 521,655

3 Claims. (Cl. 204—52)

Matter enclosed in heavy brackets [ ] appears in the original patent but forms no part of this reissue specification; matter printed in italics indicates the additions made by reissue.

This application is a continuation-in-part of my copending application, Serial No. 571,543, filed January 5, 1945, now abandoned.

This invention deals with bright copper plating, and in particular with bright copper plating by electrolysis from an acid bath.

It is an object of this invention to provide a bright copper deposit by electrolysis from an acid bath which yields smooth and very uniform deposits.

It is an object of this invention to provide a bright copper deposit by electrolysis from an acid bath which yields a coating of an exceedingly high luster so that buffing is not necessary.

It is another object of this invention to provide a a bright copper deposit by electrolysis of an acid bath with which operation can be satisfactorily continued over a long period of time without noticeable deterioration of the bath or impairment of the coating.

It is still another object of this invention to provide a bright copper deposit by electrolysis of an acid bath with which an electric current of high density may be used.

It is still another object of this invention to provide a bright copper deposit by electrolysis of an acid bath which does not require frequent renewal of the electrode and discarding of the bath used.

It is still another object of this invention to provide a bright copper deposit by electrolysis using an acid bath which does not become turbid after some time so that a filtering step does not have to be inserted from time to time.

It is still another object of this invention to provide a bright copper deposit by electrolysis using an acid bath which has a highly increased tolerance for impurities.

It has been found by the applicant during comprehensive research work that, while electrolytes based on a mixture of copper, sulphate and sulfuric acid operate satisfactorily in the beginning, the deposits become less and less uniform as the operation continues. This phenomenon was even noticed although the proportions of the ingredients of the bath were constantly kept at the same level. As a consequence of the disadvantage just described the electrolyte had to be discarded at frequent intervals and replaced by a new one.

After a great many experiments it was discovered that the change of the content of chloride anion is responsible for such unsatisfactory operation.

After this discovery it was then found out that the electrolytes when first used in the beginning had a very low content of chloride anions which were present in the form of a contamination, but that this chloride content became gradually depleted. This was when the operation started to become unsatisfactory.

Further studies of the problem revealed that if the chloride anion content of the electrolyte is controlled so as to bring it within a range of from 0.001 to 0.015 gram per liter of electrolyte all these disadvantages are overcome. A bath thus composed yields deposits of the desired properties for a very considerable period of time.

The essence of the invention thus consists in providing an electrolyte for acid copper plating in which the chloride anion content ranges from 0.001 to 0.015 gram per liter.

As has been mentioned above the predominant ingredients of the bath preferred for the electrolysis are copper sulphate and sulfuric acid.

It is advantageous to add a brightening agent to the electrolyte; derivatives of thiourea have been found especially suitable for this purpose, and in particular acetyl thiourea has yielded excellent results.

It is also advantageous, though optional, to add an agent which permits the use of an electric current of high density. Dextrin, molasses and caramel are excellent for this purpose.

Sometimes it is also desirable to add a wetting agent; sodium lauryl sulfate and sodium octyl sulfate are preferred therefor.

The invention thus consists in an electrolytic bath which contains:

75 to 275 gr./l. copper sulfate
20 to 100 gr./l. sulfuric acid
0.001 to 0.015 gr./l. chloride anion
0 to 1.0 gr./l. caramel dextrin and/or molasses
0.005 to 0.05 gr./l. of acetyl thiourea The articles to be plated are advantageously subjected to a preliminary treatment prior to the coating proper. For this purpose they are cleaned with an alkaline cleaner, dipped into acid in order to remove any rust, neutralized and then rinsed in water. It is also preferable to first apply a thin copper coating from a cyanide bath. Such a bath may contain from 3 to 5 ounces of copper metal per gallon, 1½ to 3 ounces of free sodium cyanide and from 2 to 8 ounces of sodium carbonate. Plating with this bath for from 3 to 4 minutes is sufficient. After this flash plating the article is washed to remove the cyanide.

It is furthermore advantageous to agitate the electrolyte during electrolysis. This may be carried out either by moving the cathode or by stirring the electrolyte, the latter being preferred. In particular it has been found satisfactory to effect stirring by blowing air through the bath. If stirring is carried out this way, however, it is advisable to restrict the quantity of the wetting agent to a minimum or omit it entirely, because otherwise excessive foaming takes place which impairs the operation.

The temperature of the bath is preferably maintained at between 80° and 100° F. The electric current should have a voltage of from 2.5 to 6 volts and a density of from 40 to 200 amps. per square foot.

In the following, two examples are given for the purpose of illustrating my invention:

EXAMPLE I

An electrolyte was used having the following composition:

250 gr./l. $CuSO_4.5H_2O$
60 gr./l. sulfuric acid
0.005 gr./l. chloride anion
0.10 gr./l. dextrin
0.015 gr./l. acetyl thiourea
0.02 gr./l. sodium octyl sulfate The bath had a temperature of 95° F. Agitation was carried out by blowing air through the bath. The electric current had a density of 100 amps. per square foot and a voltage of 4.5 volts.

The coating obtained in this instance was extremely smooth and uniform and had a high luster. The bath did not show any turbidity even after a use of several weeks.

The tolerance for impurities for a bath of this invention is considerably increased in particular for iron, zinc, chromium and nickel. For instance, without the presence of chloride anions, an iron content of 0.25 gr./l. is harmful and impairs the operation. With a chloride anion content as set forth in this specification several grams per liter may be present in the electrolyte and the operation will be satisfactory.

EXAMPLE II 200 gr./l. copper sulfate
50 gr./l. sulfuric acid
0.005 gr./l. chloride anion
0.10 gr./l. caramel and/or molasses
.03 gr./l. acetyl thiourea
0.10 gr./l. sodium lauryl sulfate The process with this electrolyte was carried out under the same conditions as were used in connection with Example I with the exception that agitation of the electrolyte was effected by moving the cathode instead of introducing air. The same favorable results were obtained.

It will be understood that while there have been described herein certain specific embodiments of my invention, it is not intended thereby to have it limited to the details given in view of the fact that this invention is susceptible to various modifications and changes that come within the spirit of the disclosure and the scope of the appended claims.

I claim:

1. In a method of electrolytically depositing copper from a copper sulfate-sulphuric acid bath containing acetyl thiourea in an amount of from about 0.005 to 0.05 gm./l. and chloride anion in an amount of from about 0.001 to 0.015 gm./l., the step of maintaining the chloride anion concentration at a constant value within the range of about 0.001 to 0.015 gm./l. by addition of a chloride[.], *and wherein the bath is maintained at a current density of from 40 to 200 amperes per square foot.*

2. In a method of electrolytically depositing copper from a copper sulfate-sulfuric acid bath containing a thiourea compound in an amount of from about 0.005 to 0.05 gm./l. and chloride anion in an amount of from about 0.001 to 0.015 gm./l., the step of maintaining the chloride anion concentration at a constant value within the range of about 0.001 to 0.015 gm./l. by addition of a chloride[.], *and wherein the electric current density is from 40 to 200 amperes per square foot, with voltage of 2.5 to 6.0.*

*3. In a method of electrolytically depositing copper from a copper sulfate-sulphuric acid bath containing a thiourea compound in an amount of from about 0.005 to 0.05 gm./l. and chloride anion in an amount of from about 0.001 to 0.015 gm./l., the step of maintaining the chloride anion concentration at a constant value within the range of about 0.001 to 0.015 gm./l. by addition of a chloride and wherein the bath is maintained at between about 80 and 100° F. and the electric current density is from 40 to 200 amperes per square foot with a voltage of 2.5 to 6.0.*

References Cited in the file of this patent or the original patent

UNITED STATES PATENTS

| | | |
|---|---|---|
| 964,096 | Edison | July 12, 1910 |
| 2,355,070 | Hartford | Aug. 8, 1944 |
| 2,391,289 | Beaver | Dec. 18, 1945 |
| 2,462,870 | Keller | Mar. 1, 1949 |

FOREIGN PATENTS

| | | |
|---|---|---|
| 6,974 | Great Britain | Mar. 22, 1887 |

OTHER REFERENCES

Clifton et al.: Metal Finishing, September 1942, pp. 457–458.

Buswell: Chemistry of Water and Sewage Treatment, 1929, pp. 74–76.

Operating Manual, Daybrite Acid Copper Process, pp. 2–3.